United States Patent [19]
Eck et al.

[11] Patent Number: 5,593,108
[45] Date of Patent: Jan. 14, 1997

[54] BOBBIN FOR RECEIVING ELONGATED WINDING MATERIAL

[75] Inventors: Werner Eck, Herzogenaurach; Georg-Michael Horndler, Barthelmesaurach; Werner Lepach, Schwabach, all of Germany

[73] Assignee: Maschinenfabrik Niehoff GmbH & Co. KG, Germany

[21] Appl. No.: 284,450

[22] PCT Filed: Dec. 3, 1993

[86] PCT No.: PCT/EP93/03404

§ 371 Date: Oct. 14, 1994

§ 102(e) Date: Oct. 14, 1994

[87] PCT Pub. No.: WO94/13570

PCT Pub. Date: Jun. 23, 1994

[51] Int. Cl.⁶ ............................. B65H 75/14; B65H 75/22
[52] U.S. Cl. ................... 242/608.5; 242/605; 242/118.6; 242/614.1
[58] Field of Search ................... 242/608.2, 605, 242/608.5, 609.1, 609, 613.5, 614.1, 118.6, 118.4, 680, 300

[56] References Cited

U.S. PATENT DOCUMENTS

| | | | |
|---|---|---|---|
| 3,201,061 | 8/1965 | Volk | 242/118.6 |
| 3,635,421 | 1/1972 | Boland et al. | 242/118.6 |
| 3,822,841 | 7/1974 | Campbell | 242/608.6 |
| 3,827,651 | 8/1974 | Benson et al. | 242/608.2 X |
| 3,940,085 | 2/1976 | Campbell | 242/118.4 X |
| 4,176,804 | 12/1979 | Nemoto et al. | 242/609.1 |
| 4,266,738 | 5/1981 | Nakagawa | 242/608.5 X |
| 4,462,555 | 7/1984 | Olson et al. | 242/118.6 |
| 4,471,919 | 9/1984 | Leunig | 242/608.2 |
| 4,903,913 | 2/1990 | McCaffrey | 242/118.6 X |
| 5,014,923 | 5/1991 | Robertson | 242/608.5 |
| 5,255,863 | 10/1993 | Horndler | 242/159 |
| 5,409,180 | 4/1995 | Stewing | 242/614.1 X |

FOREIGN PATENT DOCUMENTS

| | | | |
|---|---|---|---|
| 0504503 | 9/1992 | European Pat. Off. | |
| 963686 | 7/1950 | France | 242/608.2 |
| 2822213 | 11/1979 | Germany | |
| 3712680 | 10/1988 | Germany | |

*Primary Examiner*—Michael R. Mansen
*Attorney, Agent, or Firm*—Parmelee, Bollinger & Bramblett; George W. Rauchfuss, Jr.

[57] ABSTRACT

A winding bobbin for receiving elongated winding material, in particular metal-containing winding material, comprises a winding core having two flanges arranged thereon and which is preferably made of plastic. At least one flange is removable whereby locking elements are provided for locking the flange on a winding core, ensuring a stable connection between the flange and the winding core in the axial direction. Preferably, a locking element is provided to prevent the removable flange from being unintentionally loosened from the winding core.

16 Claims, 13 Drawing Sheets

BOBBIN FOR RECEIVING ELONGATED WINDING MATERIAL

FIELD OF THE INVENTION

The present invention relates to a bobbin for receiving elongated winding material. Elongated winding material is to be understood here as metal-containing winding material, in particular, copper, such as wire, bare cord or strand or a plastic covered cord or strand and the like. The invention should also be applicable for a winding material such as, for example, glass fiber cable which can be wound in a similar manner as the given example. For simplification, in the following, such an elongated winding material will be shown generally as a wire type of material.

BACKGROUND OF THE INVENTION

Normally, wire and, in particular, copper wire is transported in the same way as thread and has a metal bobbin on which the wire is wound. The metal bobbin is formed to be symmetric in the rotational direction and has a cylindrical winding core, on whose respective ends a flange is arranged, which defines a winding space for receiving the winding material. A continual longitudinal bore is provided coaxial with the rotational axis of the bobbin and extends conically on one or both of its ends. The winding device comprises corresponding conically formed bobbin-receiving elements which grip the conical recesses of the bobbin and which, during the winding process, simultaneously holds and centers the bobbin. The winding process itself is carried out such that either the bobbin rotates or the wire encircles the stationary bobbin by way of a flyer spinning device, in order that the wire is wound on the bobbin. While with the rotating bobbin the winding of the wire is carried out twist-free, the winding of the wire by way of the flyer spinning device results in a wire having a self-twist, a so-called turn of 360° pro winding.

Metal bobbins have the advantage of high stability and a long working life. However, on the other hand, they have the disadvantage that the proportional weight of the metal bobbin to the finished threaded bobbin is relatively high and that the metal bobbins must be transported from the wire user back again to the wire producer which results in considerable additional transport costs.

Various suggestions have been made in order to reduce the volume of bobbins to be transported back, e.g., by exporting metal bobbins or plastic bobbins, which have been divided into parts, i.e., after winding of the winding materials, the flanges are taken from their winding cores and separately packed which results in a reduced transport volume. The known divided bobbins have, however, the disadvantage that the assembly and disassembly is partly very complicated so that the advantage of a reduced transport volume is offset by the increased labour expense. Furthermore, with many of these known winding bobbins the stability of the assembled bobbin is relatively low so that the danger arises that the connection between the flange and the winding core comes unloose while the bobbin is being mounted in a winding machine or during the winding-up or unwinding process, which leads to considerable set-backs in the working process.

SUMMARY OF THE INVENTION

Therefore, it is the task of the present invention to provide a winding bobbin having removable flanges whose assembly and disassembly takes place in an easy manner and which at the same time has a very stable connection.

The winding bobbin according to the invention has at least one removable flange. The connection between the removable flange and the winding bobbin is effected by catch projections provided on the winding core at a distance to each other and which project inwards. These catch projections interact in the mounted condition with corresponding holding projections formed on the removable flange.

This arrangement allows the connection to absorb high axial forces so that the winding bobbin is in total, very stable.

The catch elements and the holding projections are brought into engagement with one another such that, at first the catch projections of the winding core are placed between the holding projections and then the winding core is rotated with respect to the flange so that the holding projections and the catch projections come into engagement with one another.

Moreover, it is preferred that at least one locking element is provided which engages in the space between the holding projections and blocks any relative movement between the winding core and the removable flange once the holding projections and the catch projections have come into engagement.

With this embodiment, a loosening of the connection between the flange and the winding core which may occur during the normal handling of the winding bobbin and also, alone from the occurance of high axial and radial forces, is practically eliminated. Therefore, a very reliable connection is obtained.

As will be explained later on, the locking element can be so formed that the connection between the flange and the winding core can be loosened with the hand. It is then possible to unlock the flange with a single movement and to loosen the flange from the winding core by rotation.

The winding core can be cylindrically or conically formed. In particular, with a cylindrical arrangement both flanges are preferably removable. In this case, both flanges have identical locking means so that both flanges are interchangeable with one another at the respective ends of the winding core where they are to be fixed.

In particular, with this cylindrical form of the winding core, the winding core can be formed to have a division of parts and can, in fact, be divided along its rotational axis in order that the transport volume of the disassembled winding bobbin is further reduced.

In the case that the winding core is conically formed, then the winding core is preferably realized such that the individual winding cores can be pushed into one another so that it results in a considerable reduction in the transport volume.

The winding bobbins can be mounted in a normal winding device for winding up and respectively unwinding the string-like materials. In particular, it is preferred that the winding bobbin can be used together with a device which, during the winding process, supports the flanges of the winding bobbin from the outside.

This has, on the one hand, the advantage that during the winding process, the flanges do not take up any winding pressure directed in the axial direction and therefore the flanges can be manufactured with low material costs and therefore also with reduced weight. On the other hand, as a result of this embodiment there follows the significant advantage that there is a significant reduction in the occurance of elastic restoring forces of the flanges in the direction of the winding materials.

In the case that a plastic bobbin is clamped with a normal conical clamping device, then the flanges can deform outwardly during the winding process as a result of the axial winding pressure seen in the direction of the winding core since the flanges receive no support from outside. As a result, a flange restoring force occurs which presses onto the winding which has been completed and can lead to process problems when the wire is unwound at a later stage. However, should the deformation of the flanges during the winding process be prevented by this embodiment, no elastic restoring force arises and there is no load present from the threaded wire and therefore, it is not necessary to have a loop-casing or a plastic covering on the finished threaded wire.

BRIEF DESCRIPTION OF THE INVENTION

Further advantages, features of and application possibilities for the present invention are presented in the following description of embodiments of the invention in associating with the drawings. The drawings show schematically:

FIG. 4 a partial view of the removable flange according to FIG. 3 seen from the upper side whereby the winding core has not been drawn-in;

DETAILED DESCRIPTION OF THE INVENTION

A first embodiment of the winding bobbin will now be described in reference to FIGS. 1 to 10 of the drawings.

Figure 1:
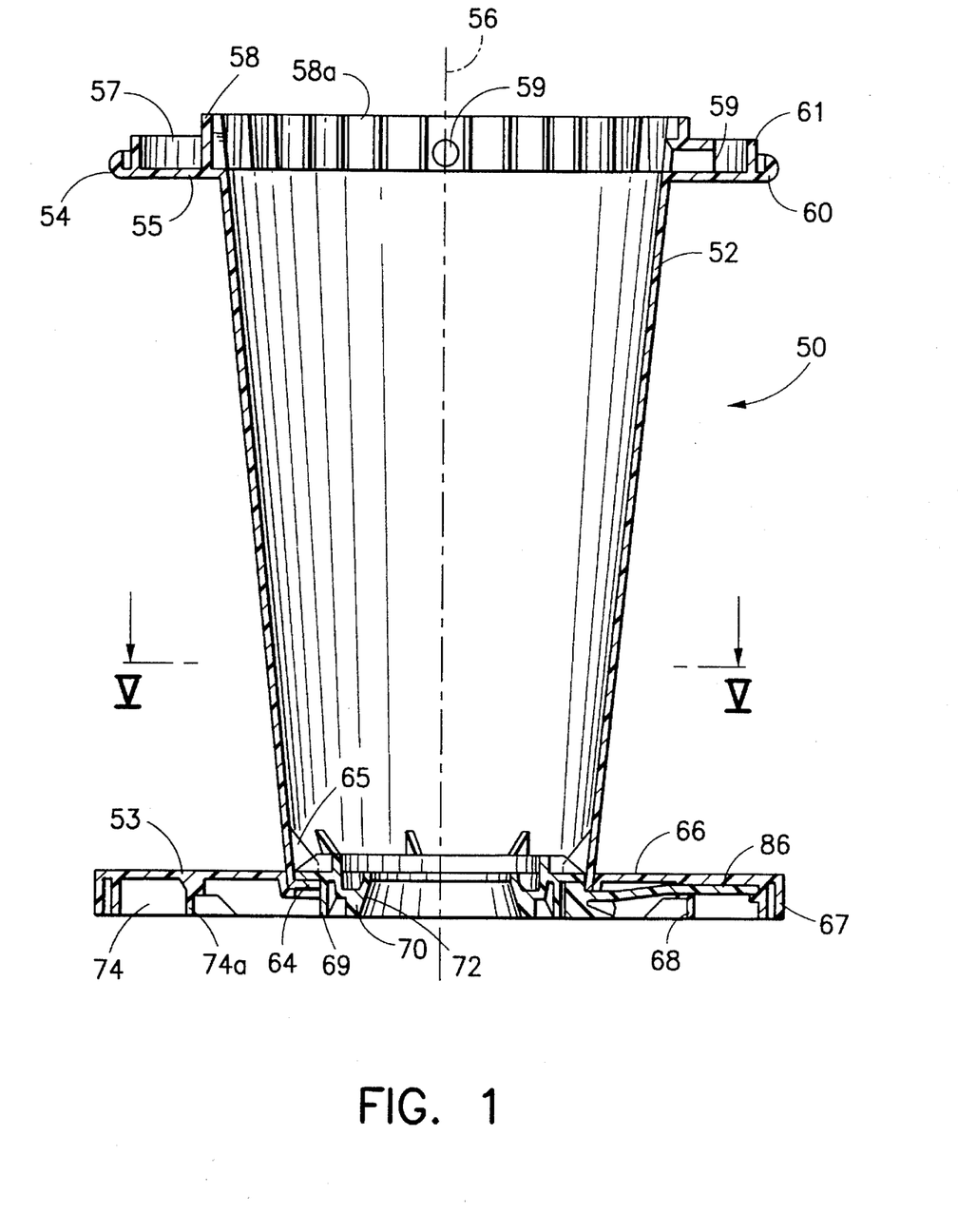
FIG. 1 a sectional drawing of a first embodiment of a winding bobbin according to the invention, cut along line I—I in FIG. 3.

The winding bobbin, identified in total by reference number 50, has a conical winding core 52 and a removable first lower flange 53 connected with the winding core at the end having the smaller diameter. A second upper flange 54 is arranged at the end of the winding core having the greater diameter and is formed integral therewith. The bobbin, as a whole, is formed substantially with rotational symmetry about the rotational or longitudinal axis 56.

The winding core 52 having flange 54 formed thereon and the removable flange 53 is made out of synthetic material.

The flange 54 has a wall part 55 substantially in the shape of a circular ring which extends in a plane which lies perpendicular with respect to the rotating axis 56 of the bobbin. The wall part 55 is strengthened by reinforcing ribs 57 arranged perpendicular thereto.

The wall part 55 is furthermore connected with a cylindrical circular ring 58, whose diameter is greater than the upper end diameter of the winding core. The ring 58 is formed as one piece with a plurality of reinforcing ribs 58a.

The upper flange 54 is furthermore provided with a number of holes 59 which serve for attaching lifting bars or jacks and respectively, for the fixing of a run-off ring thereto.

On the outer circumference of the flange, there is provided an edge or boarder 60 which is directed upwards and is rounded-off. As a consequence, it is possible to use the upper flange 54 as an aid for run-off, without the need for the run-off ring.

Neighbouring the edge 60, is a second cylindrical ring 61 which additionally reinforces the flange 54 and which is connected with the reinforcing ribs 57. At the end of the winding core having the smaller diameter, a plurality of catch projections 64 are formed which project inwards, as can be seen, in particular, from FIG. 5, whereby the stability of the catch projections 64 is increased by a radial bridge element 65 connected with the inner region of the winding core (see also FIG. 2).

Figure 5:
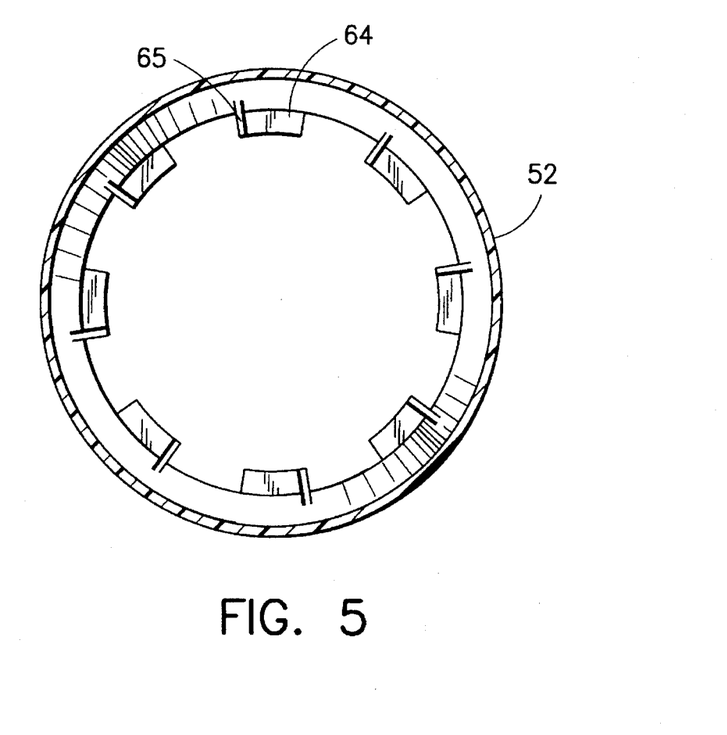
FIG. 5 a sectional view through the winding core along line I—I in FIG. 1, where the lower flange is not included.

In this embodiment, the catch projections 64 comprise eight pieces distributed around the inner circumference of the winding core with the same separating distance and are so dimensioned that the separating distance in the circumference direction, and respectively, the clear width between two neighbouring catch projections is somewhat greater than the length of the catch projection itself.

In this embodiment, for a typical construction size having the smallest diameter of winding core of 178 mm, the projections are roughly dimensioned that they project from below the inside edge of the winding core towards the inside thereof with a distance of 5 to 12 mm.

Figure 3:
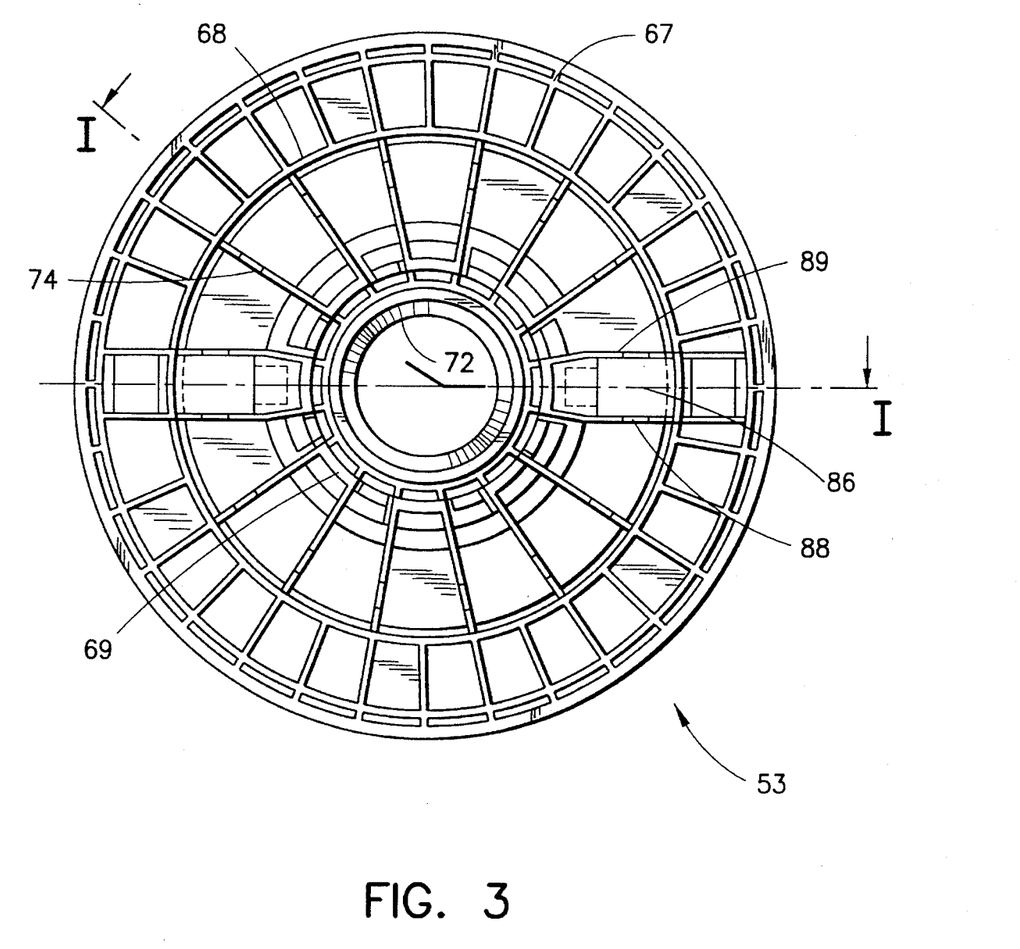
FIG. 3 a bottom view of the removable flange of the winding bobbin according to FIG. 1, where bottom view means the view seen from the side of the flange opposite the winding core.

The first removable flange 53 has a circular ring shaped plate 66, which in the assembled state faces the winding material comprises an outer ring-like reinforcing member 67 facing away from the winding material and is formed in the shape of two concentric rings, a second middle reinforcing member 68 in the shape of a ring, as well as, a third inner lying ring-shaped reinforcing member 69. Concentric to the rotating axis of the flange (which corresponds in the mounted condition to the rotating axis of the bobbin), a centering ring 70 is provided which neighbours the inner reinforcing ring 69 and which has a conical recess 72.

In order to further strengthen the flange, a plurality of reinforcing ribs 74, arranged equidistant to each other, are fixed on the side of the flange which opposes the winding material. In an outer region of the flange, between the outer reinforcing ring 67 and the middle reinforcing ring 68, the number of ribs is double the amount between the middle reinforcing ring 68 and the inner reinforcing ring 69, in order to effect a higher rigidity of the flange in this region.

Figure 7:
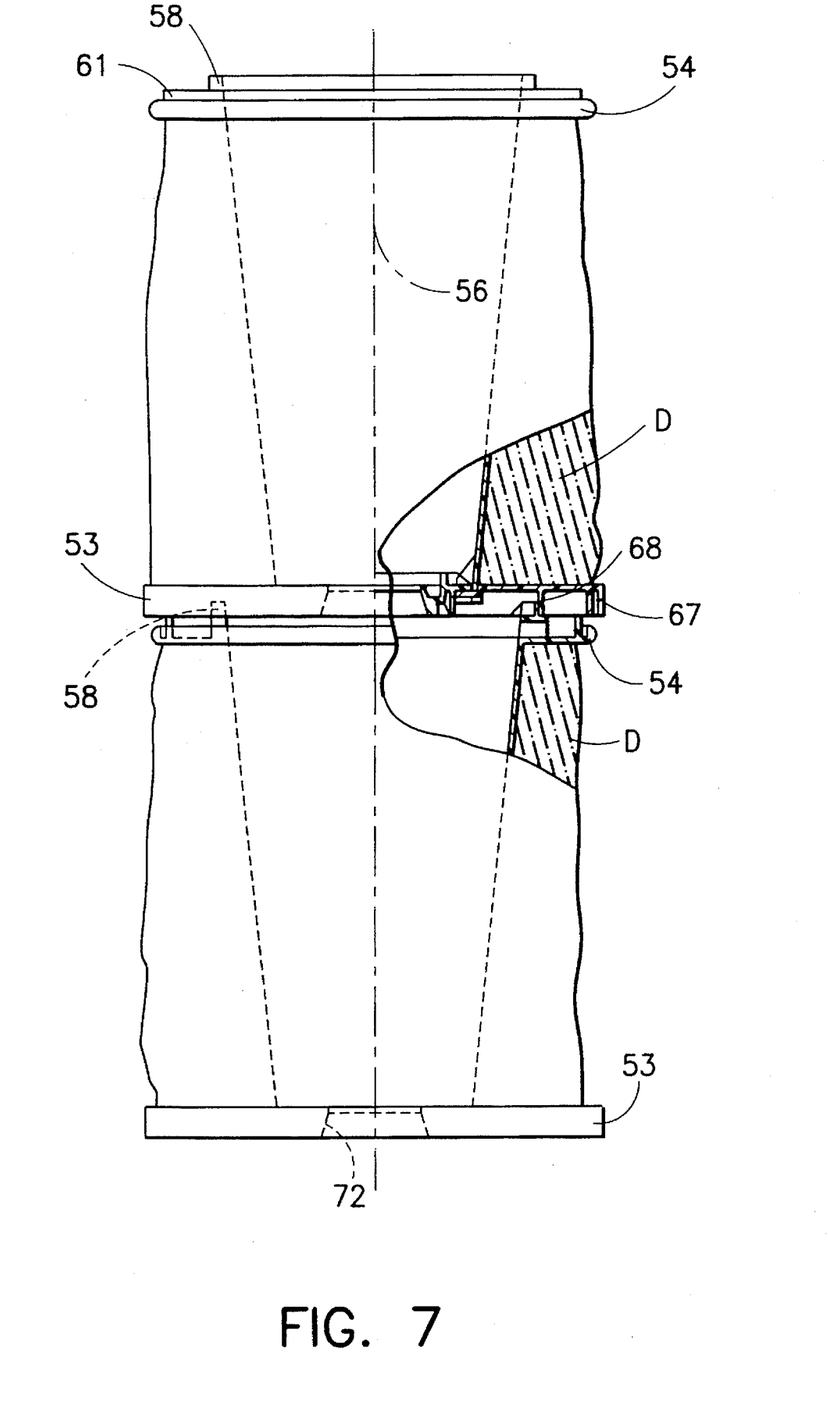
FIG. 7 a representation showing how the winding bobbins of the embodiment according to FIG. 1 are stacked one upon the other after having been wound.
Figure 8:
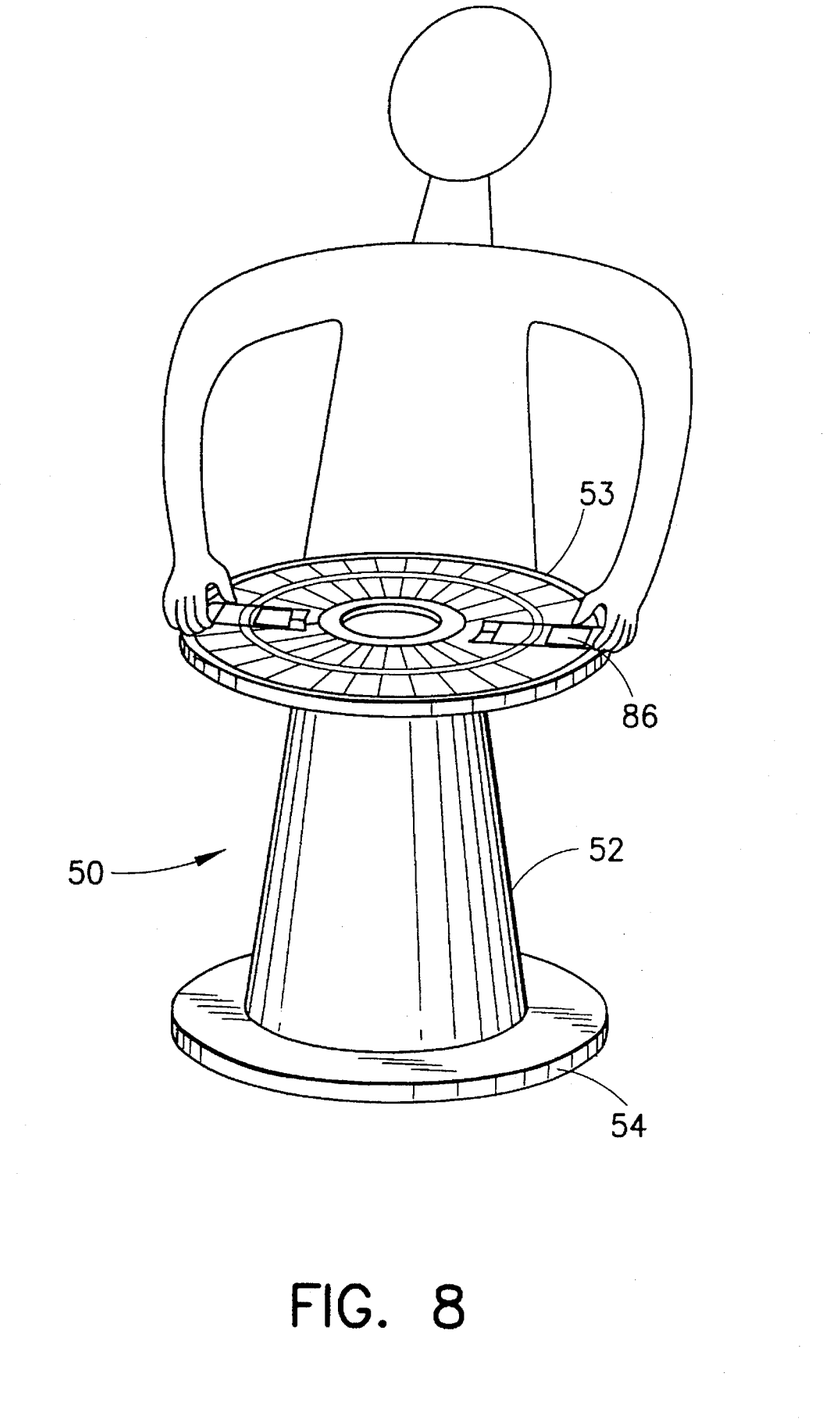
FIG. 8 the assembling of a removable flange onto a winding bobbin of the embodiment according to FIG. 1.

The diameter of the reinforcing ring 68 is slightly greater than the diameter of the reinforcing ring 58 of the second flange 54. Furthermore, the reinforcing ribs 74 in the region of the reinforcing ring 68 have recesses 74*a* (see FIG. 1). In the case, that the wound bobbins are stacked one upon the other, as shown in FIG. 7, the reinforcing ring 58 of the second flange engages in these recesses 74*a* whereby the upper part of the reinforcing ring 58 comes into placement with the reinforcing ring 68. As a result, when stacking, the upper bobbin is exactly centered with respect to the lower bobbin and an off-centering of the upper bobbin with respect to the lower bobbin is prevented.

Figure 2:
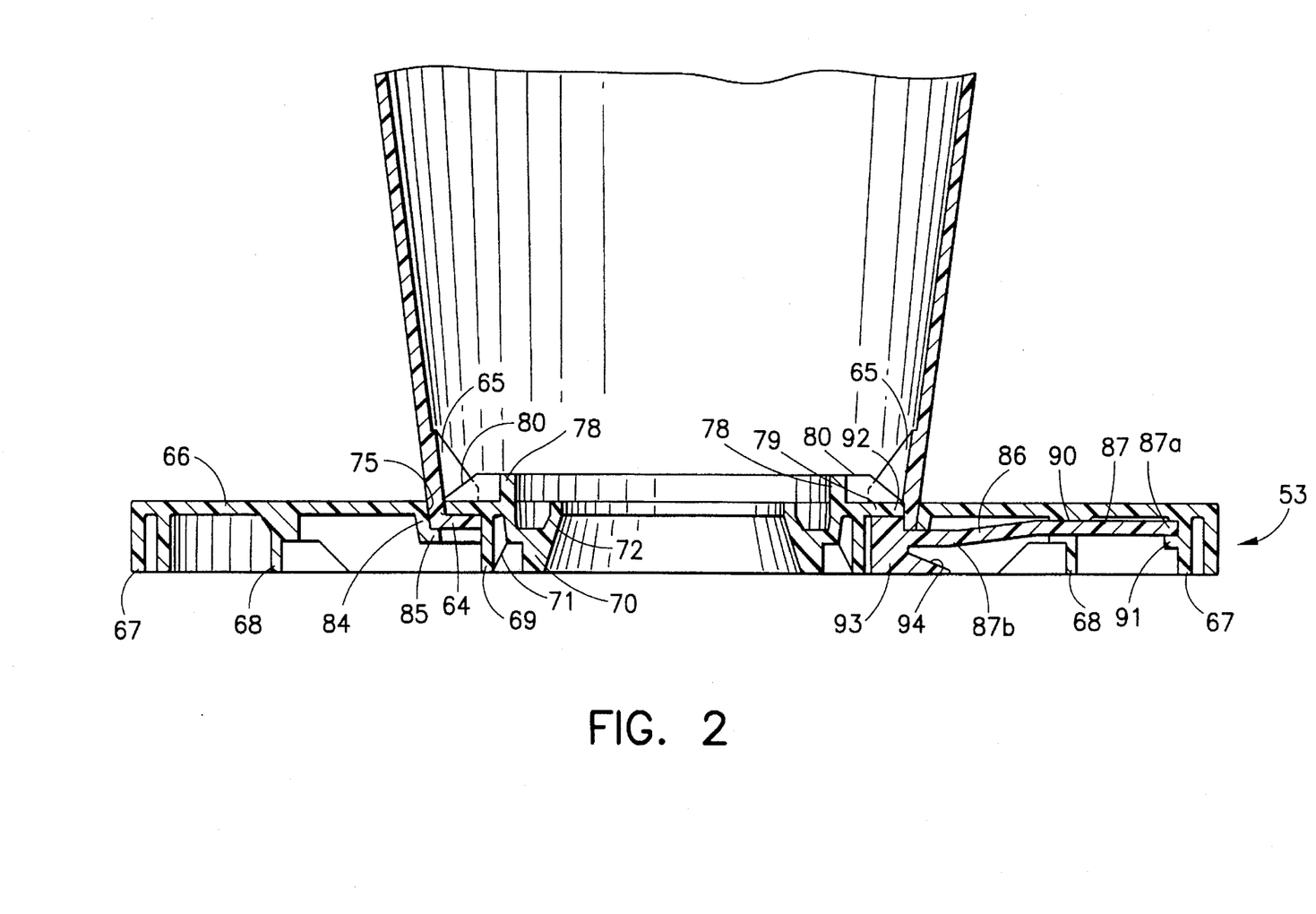
FIG. 2 an enlarged partial representation of the winding bobbin according to FIG. 1.

In the mounted condition, the side of the flange 53 facing the winding material has a substantially circular ring-shaped recess 75 in which, a support structure 76 is arranged which interacts with the catch projections 64 of the winding core.

The support structure 76 has a cylindrical ring 78 arranged concentric with respect to the rotating axis and from which a number of support projections 79 project radially outwards. On each of the support projections, a reinforcing rib 81 is arranged which extends in the radial direction for producing an additional connection between the support projections and the cylindrical ring 78 and thereby strengthens the support projections in the axial direction of the winding bobbin.

Between the support projections 79, a spacing is provided in the circumferential direction, as is indicated by the double arrow 83, and which is somewhat greater than the dimension of the catch protections 64 of the winding core.

The ring-shaped recess 75, which, in particular, can be best seen from FIG. 2, is formed by a first wall section 84, whose front wall surface, which faces the winding material, is inclined with respect to the rotating axis with the same angle as the wall of the winding core 52. A second wall section 85 is connected to this first wall section 84 and is arranged perpendicular with respect to the rotating axis.

The connection between the winding core and the flange is carried out by the winding core being placed on the flange (compare also with FIG. 8), such that the catch projections 64 lie in a region of the space 83 of the flange. As a result, the winding core can be introduced in the flange such that the lower end of the winding core having the catch projections 64 lies on the second wall section 85, as is shown in FIG. 2. Finally, the winding core and the flange are rotated relative to one another until the bridge elements 65 of the catch projections 64 lie on the reinforcing bridge elements 81 of the support projections 79. In this position, each respective catch projection 64 grips below an associated support projection 79, which results in a safe axial connection between the winding core and the flange.

Figure 4:
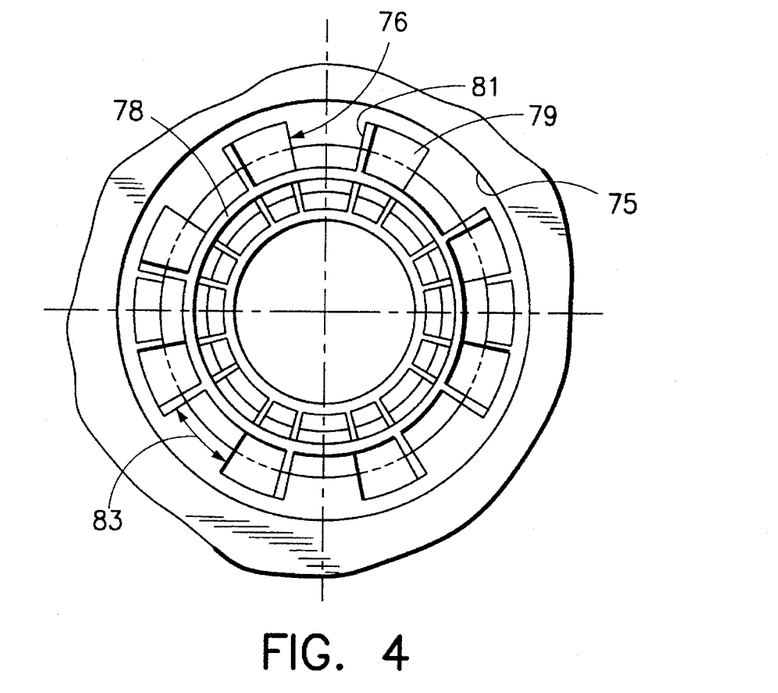

In order to also ensure the connection in the radial direction, a locking element is provided, whose construction will now be described in reference to FIGS. 2, 3 and 4.

The locking element 86 is made from an elastic material, such as plastic or metal, and has a longitudinal plate 87 which is guided through two side ridges 88 and 89 in the flange. Furthermore, a recess 90 is provided in the middle reinforcing ring 68 through which the plate 87 is guided and the reinforcing ring 67 has a rib 91 projecting radially inwards which forms a pocket in which the end 87*a* of the plate of the locking element 86 which opposes the winding core, is held. In this position, the plate 87 is substantially parallel to the surface of the flange 53 facing the winding material and is held in this position.

On the end 87*b* of the plate facing the winding core, a ridge 92 is formed as one piece therewith, and its width is somewhat smaller than the width of the space 83 between the two support projections 79 of the flange.

On the side of the plate 87 opposing the ridge 92, a wedge-like extension 93 is configured through which a gap 94 is formed.

The front end 87*b* of the plate only has a small separation to the inner reinforcing ring 69 of the flange 53 such that the locking element 86 is held securly to the flange by the rib 91, the recess 90 and the ring 69.

In the following, the function of this locking element will now be described.

By the introduction of the winding core into the ring-shaped recess 75 of the flange, the locking element (according to the representation shown in FIG. 2) is elastically deformed and pressed downwards. As soon as the lower end of the winding core reaches the second wall section 85, the winding core is rotated whereby the catch projections 64 come to lie underneath the projections 79. In this position, the space between the two neighbouring support projections, between which the locking element is arranged, becomes free and the locking element moves upwards again as a result of the elastic restoring force. As a result, the space between these support projections is closed and the winding core and the flanges are prevented from having a relative movement with respect to each other in the radial direction. The flange, in this condition, is therefore secured axially, as well as, radially with respect to the winding core.

The wedge-like recess 93 has a double function. As has been explained above, the winding bobbin according to the invention, is preferably wound in a winding apparatus which is supported in the axial direction by the flange of the winding bobbin. As well, a winding apparatus is preferably used which takes up the winding bobbin having a vertical orientation to the rotating axis, and which has a lower supporting plate with a centering device and an upper supporting plate with a centering device. Since the wedge-shaped extension has its lower end coinciding exactly with the lower ends of the reinforcing ribs 67, 68 and 69 (shown in the representation according to FIG. 2), this wedge-shaped extension likewise lies on such a supporting plate. As a consequence, movement of the locking element in axial direction with respect to the winding core is prevented, such that a deformation of the locking element and with it a decrease in the radial safety is excluded.

Figure 9:
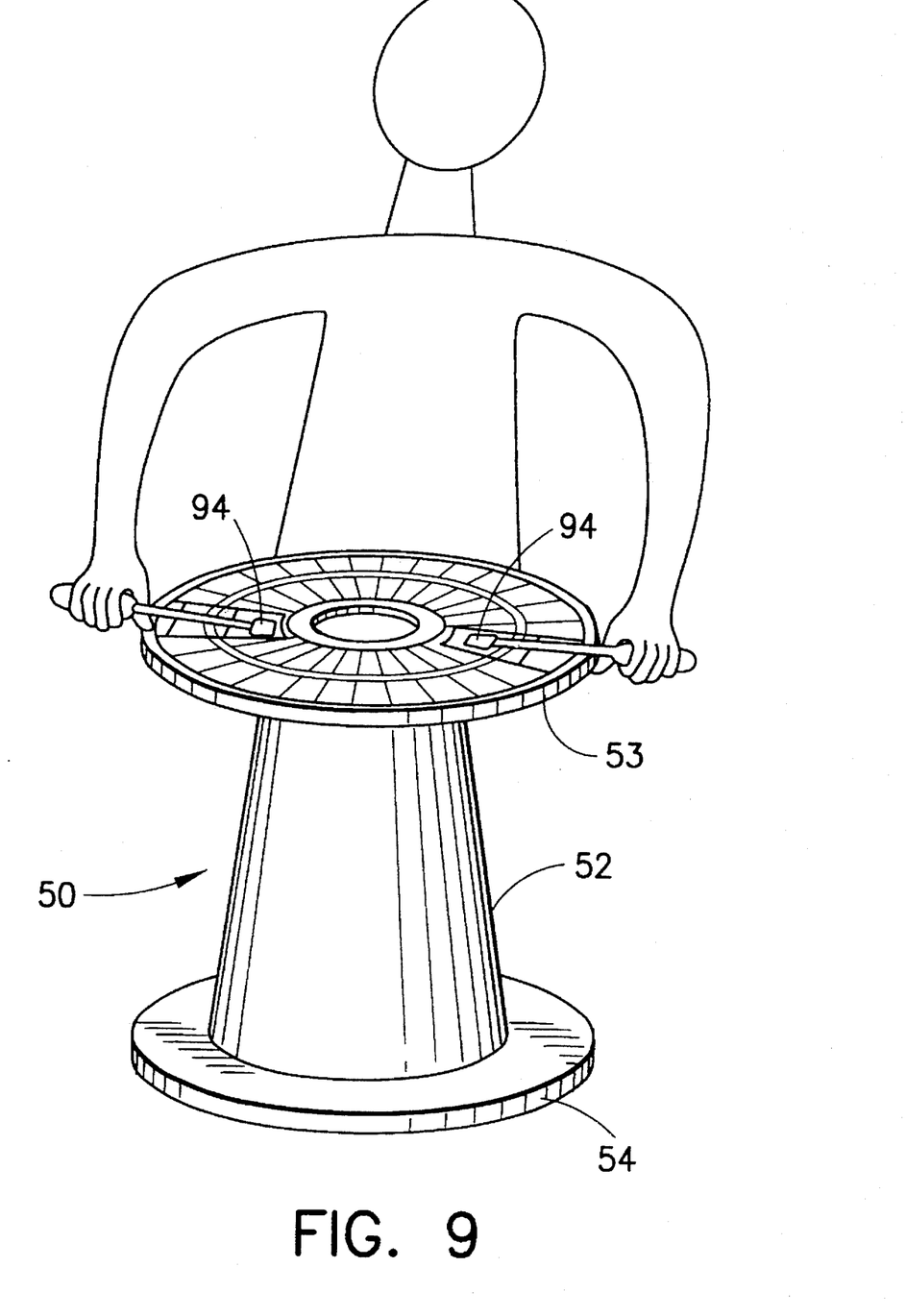
FIG. 9 the disassembling of the removable flange from the winding bobbin of the embodiment according to FIG. 1.

For disassembling the winding core, as shown in FIG. 9, a suitable working tool can be used, for example, a screwdriver, which is introduced into the wedge gap 94. The wedge gap 94 and, as well, the front end 87*b* of the plate 87 are, as a result, pressed downwards (shown in the representation according to FIG. 2), whereby the ridge 92 releases the space between the neighbouring support projections, and the flange and winding core can be rotated against one another. The winding core can then be taken from the flange without any further manual activity.

In a particular preferred embodiment, the wedge gap can be so formed that, in contrast to the representation according to FIG. 9, the locking condition can be released by hand. By means of the finger, the operating force is engaged in the wedge gap and lifts the locking element. At the same time, the flange is rotated in the opening direction and can then be taken from the winding core. In this manner, it is possible to unlock the flange practically with a single movement and take it from the winding core. Therefore, the time needed to disassemble the flange is shortened to a minimum without affecting the stability of the connection of the flange and the winding core.

After separating the removable flanges 53 from the winding cores 52, the winding cores can be stacked so as to save space whereby the cores are pushed one inside the other.

Figure 6:
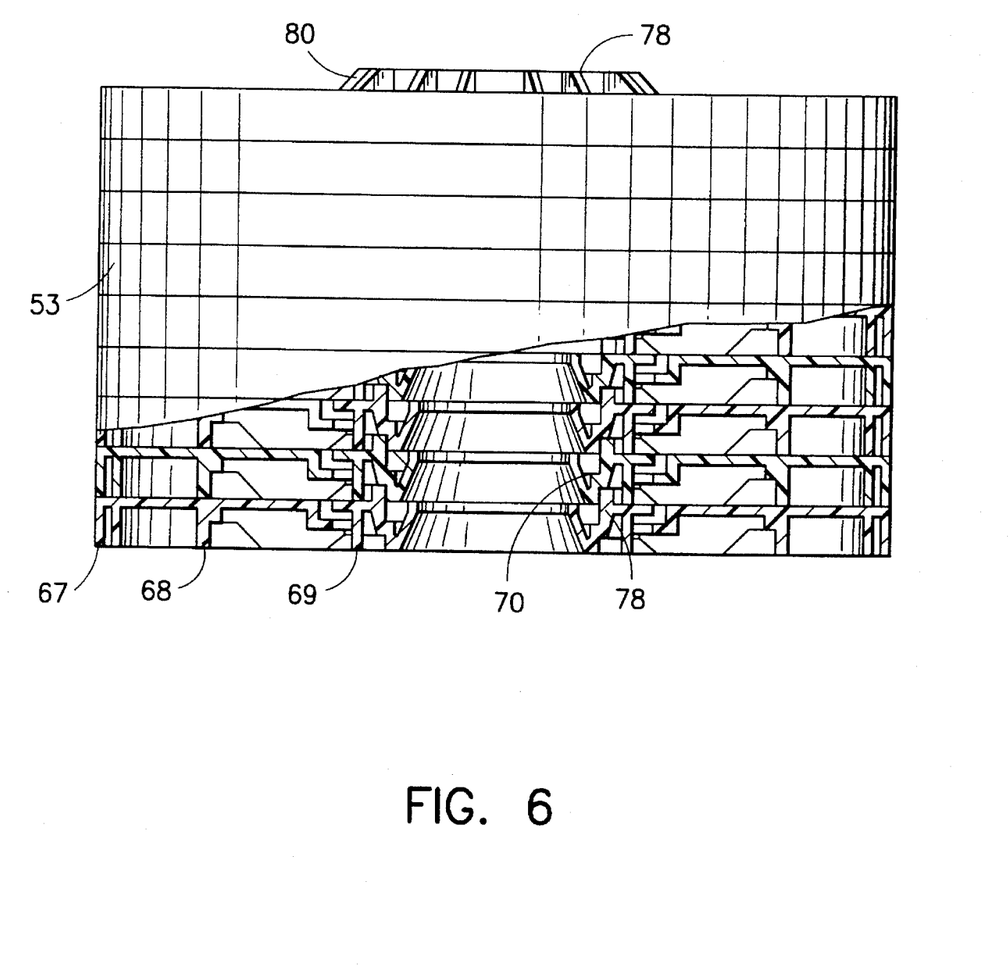
FIG. 6 a plurality of removable flanges of the winding bobbin according to FIG. 1 in a condition in which they have been stacked one upon the other.

As is shown in FIG. 6, the removable flanges 53 of the bobbin 50 can also be stapled one upon the other as a way of saving space.

In stacking the flanges (compare with FIG. 2 and FIG. 6), the ring 78 engages in the space 71 between the ring 69 and the ring 70 of the flange 53. In addition, the ring 69 has a row of notches, indicated in FIGS. 2 and 3, in which the bridge element 81 engages when stacking.

Due to the interaction of ring 78, ring 69 and ring 70, the flanges are secured radially to one another such that they will not shift against one another in the stacked condition. The bridge element 81 and the associated notches moreover present a safeguard against any rotation of the flanges in the stacked condition.

The advantages of the design of the bobbin according to the invention which is to be transported, is explained by way of an example. In order to transport 100 assembled bobbins, having a normal diameter dimension of 400 mm, 17 palettes were necessary since only 6 bobbins fit onto a respective palette. The necessary loading area in total is 16.32 m², which means with a loading height of 610 mm, a loading volume of 9.95 m³.

In comparison, when 100 disassembled bobbins according to the invention were transported, 4 stacks with respectively 25 winding cores and two stacks with respectively 50 removable flanges, could be arranged on a single palette. The total loading area corresponded to the area of a palette of 0.96 m², with a loading height of 1275 mm which means a loading volume of 1.224 m³.

By employing bobbins according to the invention, meant a reduction in the loading area of 1/17 and a reduction in the loading volume of 1/8. In addition, the loading and unloading is substantially simplified since the loading of these 100 bobbins means only one single palette must be moved.

According to the design of the bobbin of the invention, a bobbin is provided which, on the one hand, has a high stability and which, on the other hand, can be transported in a simple manner at low costs. For connecting and respectively, separating the bobbin only a few seconds is respectively required.

The embodiment described in reference to FIG. 1 is particulary advantageous when it is to be wound in a winding process, as is described in EP-B-0 334 211, (corresponding to U.S. Pat. No. 5,255,863) whose disclosure is hereby referred to. According to this winding process, winding layers develop, as the winding 100 shows in FIG. 10, whose angle is inclined with respect to the angle of taper of the conical winding core 52.

Figure 10:
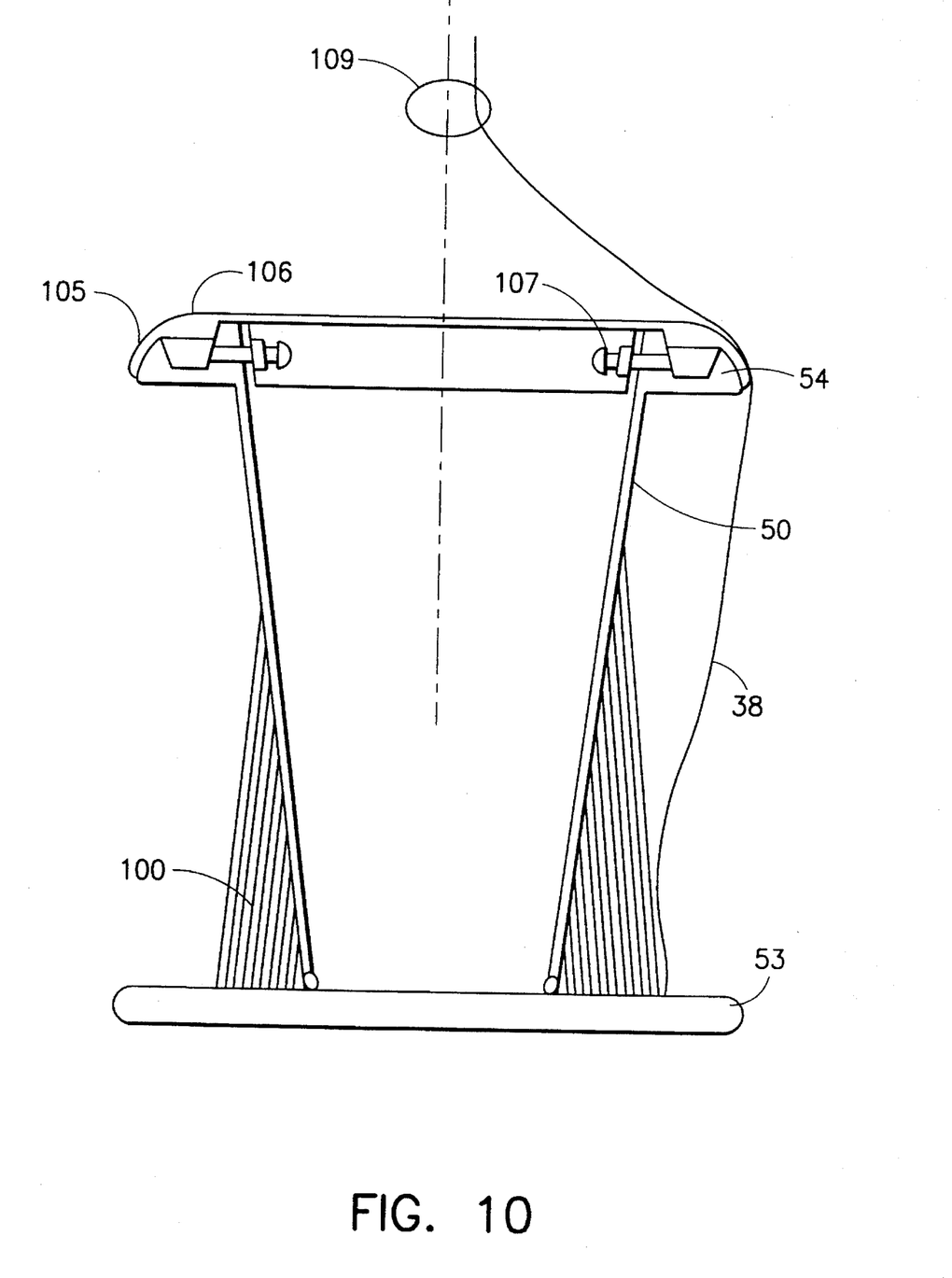
FIG. 10 the sectional view of a run-off device in use with the first embodiment.

As a result, there is produced, in association with the bobbin according to the invention, a skein of material which has particularly high stability which allows additional safety measures to be omitted, in particular, a plastic covering of the winding bobbin.

FIG. 10 shows how the winding bobbin can also be directly used for run-off or delivery.

In this embodiment, as is seen from FIG. 10, the bobbin is mounted vertically such that the removable flange 53 is underneath. This arrangement corresponds also to the orientation for winding-up. A metallic run-off ring 105 having a curved metallic upper surface 106 is fixed on the upper flange 54 and partly inserted in the plastic hollow space of the winding core 52, and is fixed with bolts 107 in the holes 59 of the winding core. The wire 38 is guided over the run-off ring 105 and through a loop 109. In this way, the wire can be taken-off the bobbin without requiring any further aid. It is also possible, to take-off the wire directly from the bobbin itself without any form of aid, that is, even without an additional run-off ring.

A further embodiment of the invention will now be described in reference to FIG. 11.

In this embodiment, the winding bobbin 150 has a cylindrical core 152. The bobbin (in the representation according to FIG. 11) has a lower flange 153 and an upper flange 154. The lower flange 153 corresponds fully in its construction to the flange 53 of the embodiment described above with the difference that the flange is provided for receiving the cylindrical winding core. Therefore, the same reference numbers are used and a further description of the details of the flanges and the locking elements is refrained from.

The flange 154 is formed identical to the flange 153 so that also in this matter, the explanation to the first embodiment can be referred to.

With the second embodiment, the flanges can be stacked and therefore save space in the same way as shown in FIG. 6. The cylindrical winding core 152 can be stacked one upon the other in the same way as pipes or tubes.

The bobbin 150 is likewise formed out of synthetic material as the bobbin 50.

The bobbin 150 has the advantage that it is considerably lighter than the corresponding bobbin formed out of steel. Moreover, the transport volume can be considerably reduced by the stacking of the flanges and the winding cores.

This bobbin having the cylindrical winding core is advantageously used, in particular, when the user of the bobbins does not have available a winding apparatus which can be controlled in such a way that the winding around a conical winding core is possible. Since the individual windings of a conical winding core have various diameters, the take-up apparatus must be controlled in a corresponding way, for example, by an electronic control device. With winding devices, not having such control devices available at ones disposal, it is therefore of an advantage to use a cyclindrical bobbin in order to realize the aim of the invention.

Figure 11:
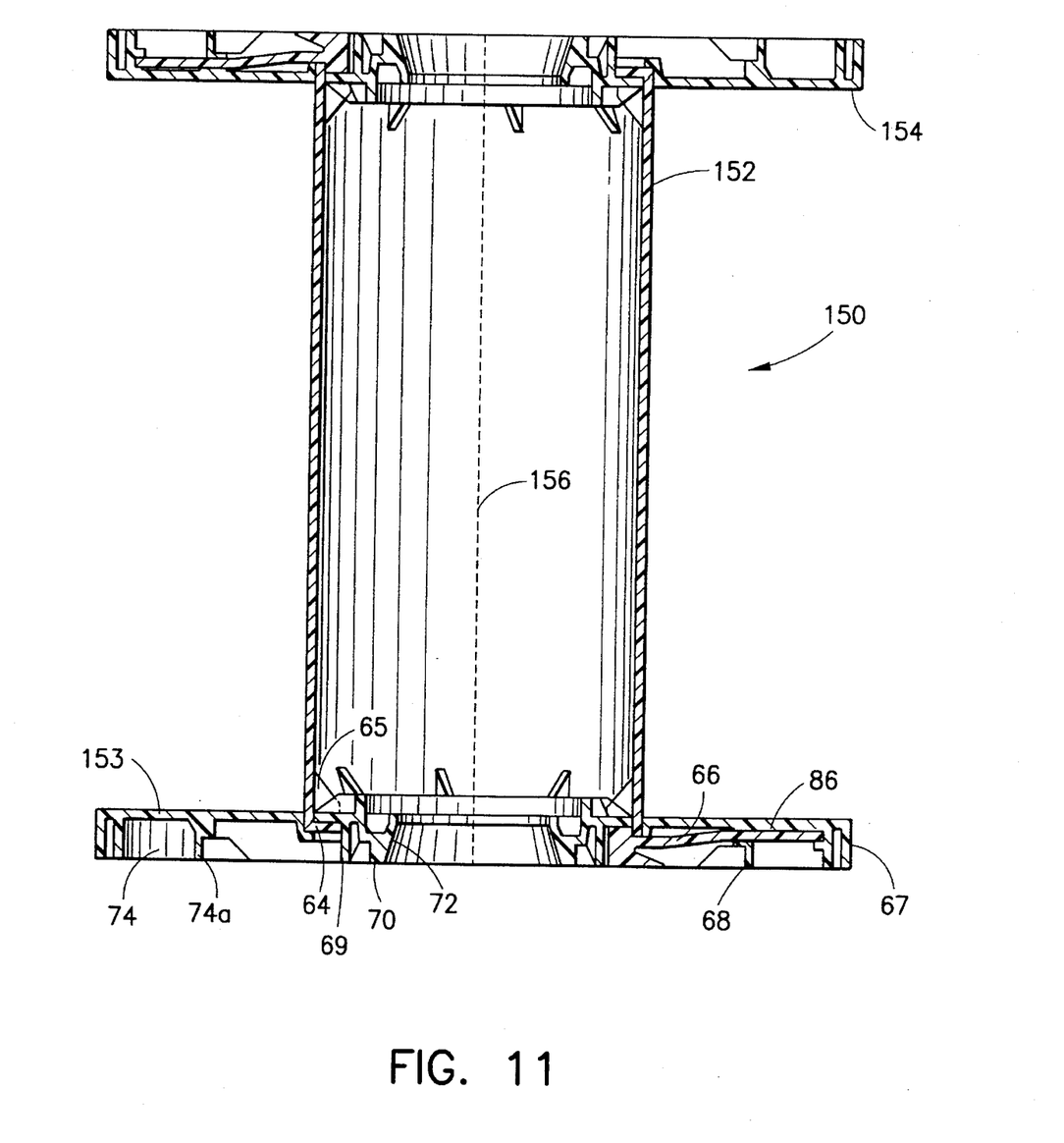
FIG. 11 a second embodiment of the bobbin according to the invention in a corresponding sectional view as FIG. 1.
Figure 12:
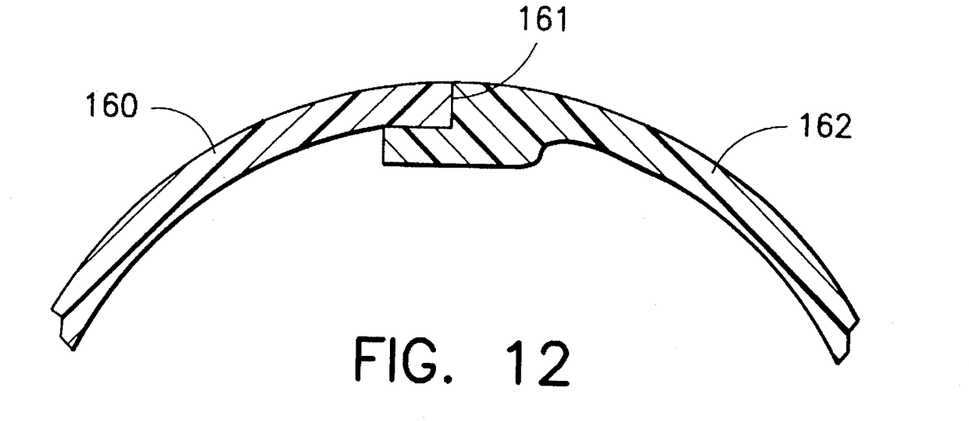
FIG. 12 a first embodiment of a connecting device of the embodiment according to FIG. 11 with a winding core divided along its longitudinal direction.

A modification of the embodiment shown in FIG. 11 is shown in FIG. 12, in which the winding core can be divided in two parts along the longitudinal direction, that is, parallel with respect to the rotating axis 156. The division of parts can be effected in two equal halves, however, it is also possible to provide a division of parts of three or more pieces. The longitudinal dividing of the winding core has the advantage that when transporting, the winding cores occupy considerably less space than in the undivided state.

The dividing of the winding core can be carried out such that one half of the winding core 160 engages with a correspondingly formed step 161 of the second half of the winding core 162. Since each half of the winding core is held in the flange of the bobbin and further, by way of a respective locking element is prevented from having relative rotational movement with respect to the flange of the bobbin, then as a consequence, already a sufficient holding of both halves of the winding core is reached.

The advantage of this embodiment is that both halves of the winding core can be constructed fully identical and can be simply pushed one against the other.

Figure 13:
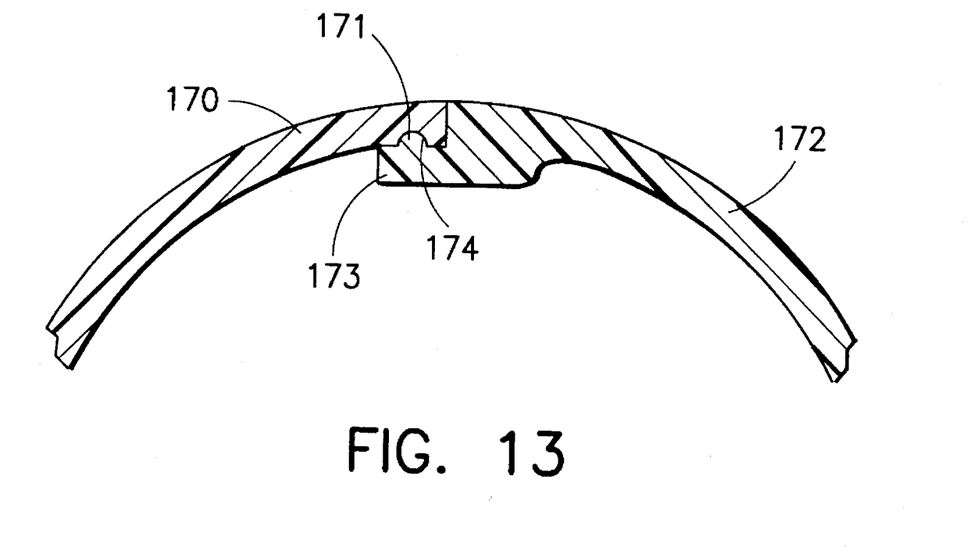
FIG. 13 a modification of the embodiment according to FIG. 12.

FIG. 13 shows a modification of this embodiment whereby in one half 170 of the winding core a longitudinal groove 171 is embedded in its inner side facing the rotational axis 156, which runs parallel to the rotation axis 156. The second half 172 of the winding core has a step 173, as in the embodiment according to FIG. 12, however, here the step is provided with a continuous projection 174 which likewise runs parallel with respect to the rotating axis 156. In this embodiment, the winding core halves can also be pushed into one another in a simple manner whereby the interaction of the groove 171 and the projection 174 means an additional security in the radial direction.

Instead of the continuous groove and the continuous projection as shown in FIG. 13, single recesses can also be provided in the inner side of the first winding core which engage with correspondingly formed projections of the second winding core.

Figure 14:
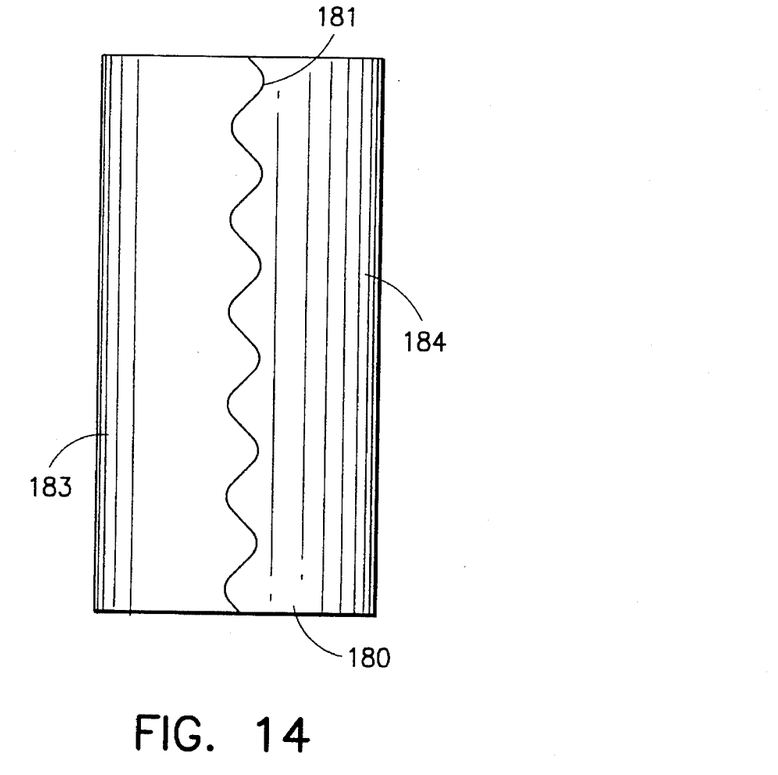
FIG. 14 a longitudinal view of a winding core dividable into two parts.

FIG. 14 shows a further embodiment of a dividable winding core 180 which is to be applied in association with the second embodiment according to FIG. 11. With this embodiment, the winding core is likewise divided in two halves 183, 184 parallel with respect to the rotating axis 156. However, here the dividing seam is not linear as in the embodiment according to FIG. 12 and FIG. 13, but instead individual projections and recesses 181 are formed in both halves of the winding core which are so formed that they engage with one another when joining together both halves.

In an analogous arrangement of the separating seam, in particular, by a corresponding sloping of the edges, it can be achieved that both halves latch directly to one another.

Figure 15:
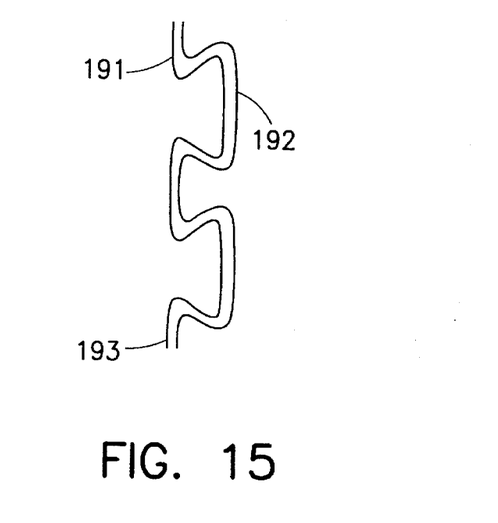
FIG. 15 a changing course which the wire follows for a divisible winding core according to the embodiment of FIG. 14.

Instead of a serpentine line-shaped separating seam, as is shown in FIG. 14, a dovetail-shaped separating seam 193 can also be incorporated in order to join a first winding core half 191 with a second winding core half 192 whereby here the dovetail-shaped separating line also runs parallel with respect to the rotating axis 156.

Figure 16:
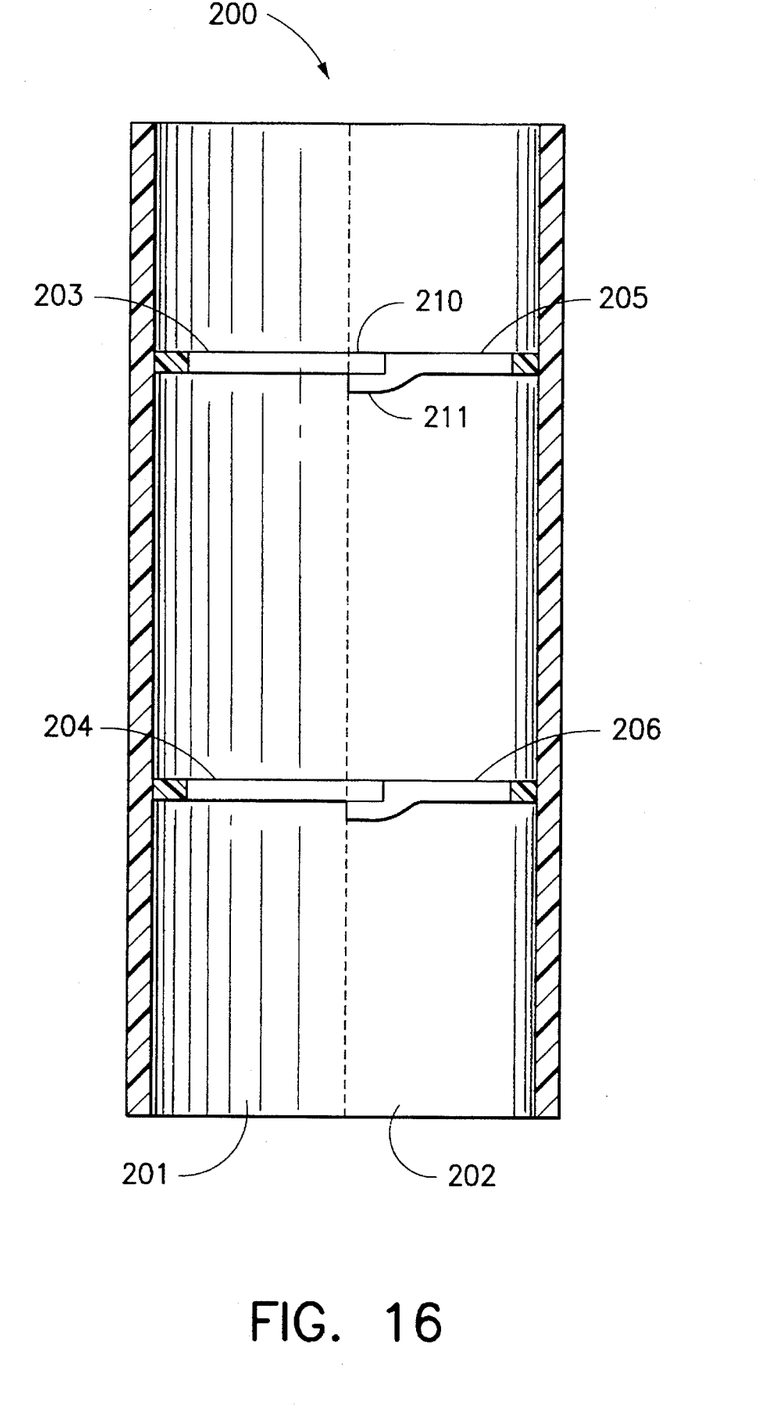
FIG. 16 a longitudinal section through a further embodiment of a divisible winding core.

A further embodiment of a detachable or dividable cylindrical winding core will now be described with reference to FIG. 16.

In this embodiment, the winding core 200 is divided along its rotational axis into two identical halves 201 and 202 that is, in the longitudinal direction. Two reinforcing ribs extending in the radial direction are provided in both halves, namely, reinforcing ribs 203, 204 in the half piece 201, and reinforcing ribs 205, 206 in the other half 202, which in the assembled condition of the winding core presents a circular ring-shaped form.

On each side of one of the winding core halves, the rib is extended with respect to the other half over into the region 210, and the corresponding associated rib of the other winding core half has a shoulder piece 211 in which the extension 210 engages.

Between the extension 210 and the shoulder piece 211, a locking means (not shown) is preferably arranged, for example, latch protections or the like which hold together both halves of the winding core.

This embodiment has the advantage that the circular ring-shaped reinforcing ribs 203, 204 improve the rigidity of the core in the radial direction such that even for a winding core having thin wall thickness and therefore a reduced weight, the winding core can still withstand the winding pressure effected in the radial direction during the winding-up process. With the locking of the reinforcing ribs, an improved cohesion of both halves of the winding core is achieved.

Instead of the two reinforcing ribs as shown, a circular formed reinforcing rib which is symmetric in the middle can also be provided, and in the case of high stresses, three or more corresponding ribs can also be provided.

The embodiment described in reference to FIGS. 12 to 16, also can be applied correspondingly when the winding core is divided into three or more parts.

In the above described embodiments, a winding bobbin has been described having a conical core which includes a removable flange and a fixed flange. This embodiment can also be modified such that the bobbin having a conical winding core has likewise two removable flanges. Furthermore, the conical winding core can also be divided longitudinally in planes parallel to its rotational axis whereby it is possible to have a division in two halves or a division of more parts.

In the embodiment having a cylindrical winding core, the second flange can be firmly joined with the winding core, in particular, it can also be formed with the cylindrical winding core as has been described for the fixed flange in reference to the winding bobbin having a conical winding core.

We claim:

1. A winding bobbin for receiving elongated string-like winding material and comprising:

a winding core formed with substantial rotational symmetry about a rotational axis and having a first end upon which a first flange is arranged, and a second end, opposite to the first end, upon which a second flange is arranged, joining means provided at least between the first end of the winding core and the first flange joining the first flange and the winding core removably with one another, catch projections spaced from one another on the first end of the winding core and projecting radially inward towards the rotational axis, support projections on the first flange, each of said support projections having a space separating each said support projections from another of said support projections in a circumferential direction of the first flange, which space is greater than a length of the catch projections, the support projections and the catch projections being in engagement with one another such that the first flange and the winding core are held relative to one another in an axial direction which corresponds to the longitudinal direction of the rotating axis of the winding core as a result of the catch projections of the winding core being placed in the spaces between the support projections followed by rotation of the first flange and the winding core relative to one another about a predetermined angle whereby the support projections and the catch projections come into said engagement with one another, and at least one locking element on the first flange, said at least one locking element being releasably engaged in one of the spaces between the support projections and blocking relative rotational movement of the winding core and the first flange.

2. A winding bobbin according to claim 1, characterized in that the second flange is formed integral with the second end of the winding core.

3. A winding bobbin according to claim 2, characterized in that on the second flange reinforcing ribs are provided which extend in the circumferential and radial directions.

4. A winding bobbin according to claim 1, characterized in that the joining means are arranged between the second end of the winding core and the second flange such that the second flange is removably connected with the winding core.

5. A winding bobbin according to claim 4, characterized in that each first flange, has a flange surface facing the winding core having a substantially circular disk shape and that on a side of the disk shaped flange surface opposing the winding core, reinforcing ribs are provided which extend in the circumferential and radial directions.

6. A winding bobbin according to claim 5, characterized in that the reinforcing ribs are formed on each flange in such a way that when a number of assembled bobbins are stacked one on top of the other, the reinforcing ribs of the first and second flange of adjacent stacked bobbins engage with one another so that an interlocking connection is achieved which prevents an off-centering of said flanges relative to one another.

7. A winding bobbin according to claim 1, characterized in that the at least one locking element on the first flange is elastically deformable winding core (52) and the flange (53), is elastically deformed from outside in such a way that in the deformed state for being releasable from the space between the support projections so that a rotating movement can take place between the winding core and the first flange.

8. A winding bobbin according to claim 1, characterized in that the at least one locking element has a thickened portion shaped such that the locking element cannot reach a position which releases rotation of the winding core when the winding bobbin together with the first flange stands on an even surface or a correspondingly shaped surface.

9. A winding bobbin according to claim 1, characterized in that the winding core is cylindrically formed.

10. A winding bobbin according to claim 9, characterized in that the winding core is divisible into parts along a plane which covers the rotational axis of the winding core.

11. A winding bobbin according to claim 10, characterized in that inside the winding core are reinforcing ribs projecting inwardly and extending in the longitudinal direction.

12. A winding bobbin according to claim 10, characterized in that inside the winding core are reinforcing ribs extending along the circumferential direction.

13. A winding bobbin according to claim 10, additionally comprising catch means locking the divisible parts of the winding core to one another.

14. A winding bobbin according to claim 1, characterized in that the winding core is conically formed.

15. A winding bobbin according to claim 1, characterized in that the winding core is a synthetic material winding core.

16. A winding bobbin according to claim 1, characterized in that said first and second flanges are synthetic material flanges.

* * * * *